United States Patent
Pahl et al.

(10) Patent No.: US 10,119,693 B2
(45) Date of Patent: Nov. 6, 2018

(54) WIRELESS POWER FOR AIRFIELD LIGHTING

(71) Applicants: Birger Pahl, Milwaukee, WI (US); Traver B Gumaer, Easthampton, MA (US); John B Schneider, West Springfield, MA (US)

(72) Inventors: Birger Pahl, Milwaukee, WI (US); Traver B Gumaer, Easthampton, MA (US); John B Schneider, West Springfield, MA (US)

(73) Assignee: Cooper Technologies Company, Houston, TX (US)

( * ) Notice: Subject to any disclaimer, the term of this patent is extended or adjusted under 35 U.S.C. 154(b) by 348 days.

(21) Appl. No.: 14/839,397

(22) Filed: Aug. 28, 2015

(65) Prior Publication Data

US 2016/0061430 A1 Mar. 3, 2016

Related U.S. Application Data

(60) Provisional application No. 62/043,471, filed on Aug. 29, 2014.

(51) Int. Cl.
*H02J 7/00* (2006.01)
*F21V 23/02* (2006.01)
(Continued)

(52) U.S. Cl.
CPC .............. *F21V 23/026* (2013.01); *B64F 1/20* (2013.01); *F21V 19/04* (2013.01); *F21V 23/001* (2013.01);
(Continued)

(58) Field of Classification Search
USPC ......................................................... 320/108
See application file for complete search history.

(56) References Cited

U.S. PATENT DOCUMENTS

| 3,316,447 A | 4/1967 | Hochstein |
|---|---|---|
| 2006/0232957 A1 | 10/2006 | Bieberdorf |

(Continued)

OTHER PUBLICATIONS

Ferla, Monica, European Search Report for patent application No. EP15183148, completion date Apr. 29, 2016, pp. 1-6, European Patent Office, place of search Munich.
(Continued)

*Primary Examiner* — Robert Grant
(74) *Attorney, Agent, or Firm* — King & Spalding LLP

(57) ABSTRACT

A wirelessly powered airfield lighting device includes a base can and a wireless power transmitter disposed in the base can. The wireless power transmitter can wirelessly transmit power. The lighting device further includes an isolation transformer disposed inside the base can. The isolation transformer is electrically coupled to and between the wireless power transmitter and a power source. The lighting device also includes a light fixture that includes a base disposed on and sealing the top end of the base can and that includes an electronics compartment. The light fixture further includes a wireless power receiver disposed in the electronics compartment and that wirelessly receives power from the wireless power transmitter. The light fixture also includes a light source that receives power from the wireless power receiver.

17 Claims, 6 Drawing Sheets

(51) Int. Cl.
  *H05B 37/03* (2006.01)
  *F21V 19/04* (2006.01)
  *F21V 23/00* (2015.01)
  *H02J 5/00* (2016.01)
  *B64F 1/20* (2006.01)
  *H01F 38/14* (2006.01)
  *H05B 37/02* (2006.01)
  *F21W 111/06* (2006.01)

(52) U.S. Cl.
  CPC .............. *H01F 38/14* (2013.01); *H02J 5/005* (2013.01); *H05B 37/02* (2013.01); *H05B 37/038* (2013.01); *F21W 2111/06* (2013.01)

(56) References Cited

U.S. PATENT DOCUMENTS

| | | | | |
|---|---|---|---|---|
| 2008/0001782 A1* | 1/2008 | That | ........................... | B64F 1/20 340/947 |
| 2012/0007519 A1* | 1/2012 | Urano | ................ | H05B 33/0815 315/281 |
| 2012/0212150 A1* | 8/2012 | Lakirovich | .......... | H05B 33/086 315/250 |

OTHER PUBLICATIONS

Translation of FR2695285, via LexsisNexis Total Patent, 7 pages.
Translation of DE102010014948, via LexsisNexis Total Patent, 7 pages.

* cited by examiner

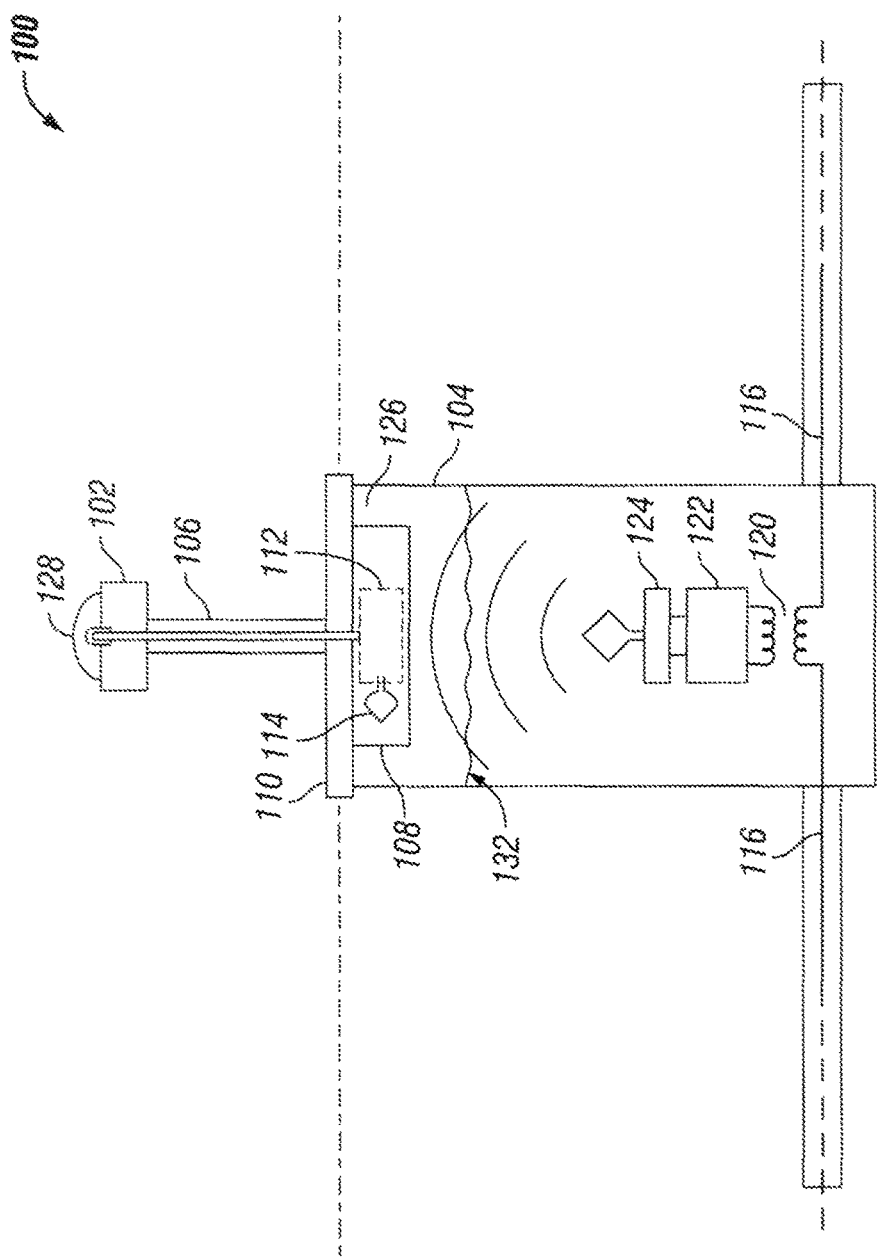

WIRELESS POWER FOR AIRFIELD LIGHTING

RELATED APPLICATIONS

The present application claims priority to U.S. Provisional Patent Application No. 62/043,471, titled "Wireless Power For Airfield Lighting" and filed on Aug. 29, 2014, the entire content of which is incorporated herein by reference.

TECHNICAL FIELD

Embodiments of the invention relate generally to airfield light fixtures, and more particularly to providing an airfield light fixture which receives power wirelessly from a power delivery assembly.

BACKGROUND

Airfield lighting systems comprise a series of light fixtures that provide various visual signals for airfield operations. For example, a runway light system typically includes a plurality of individual light fixtures connected to a circuit. Specifically, the individual lights are connected to the circuit via current transformers, which ensures that in the event that one light fails, the rest of the lights along the circuit are still operational. Typically, each individual light fixture is mounted in a base can that is disposed underground, or integrated in the runway. These light fixtures are also typically located in the airfield, which is an outdoor environment open to the elements. A common cause of malfunctions in runway lights is water getting into the can and/or light fixture through connection points.

Depending on how many individual lights are connected in series, the voltage of the power supply for this light system can be up to 5 kV. Typically, each light fixture is physically connected to a power delivery assembly (which can include a current transformer) in the can which is coupled to a high-voltage circuit. Thus, in order to remove the light fixture from the can for servicing or replacement, the light fixture needs to be physically disconnected from the assembly. In most situations, in order to repair or service an individual light fixture, the whole system may need to be shut down such that a voltage is not applied through the power delivery assembly to which the affected light fixture is connected.

SUMMARY

The present disclosure relates generally to airfield light fixtures. In an example embodiment, a wirelessly powered airfield lighting device includes a base can and a wireless power transmitter disposed in the base can. The wireless power transmitter can wirelessly transmit power. The lighting device further includes an isolation transformer disposed inside the base can. The isolation transformer is electrically coupled to and between the wireless power transmitter and a power source. The lighting device also includes a light fixture that includes a base disposed on and sealing the top end of the base can and that includes an electronics compartment. The light fixture further includes a wireless power receiver disposed in the electronics compartment and that wirelessly receives power from the wireless power transmitter. The light fixture also includes a light source that receives power from the wireless power receiver.

In another example embodiment, a wirelessly powered airfield lighting device includes a base can and a wireless power transmitter disposed in the base can. The wireless power transmitter can wirelessly transmit power. The lighting device further includes an isolation transformer disposed outside the base can. The isolation transformer is electrically coupled to and between the wireless power transmitter and a power source. The lighting device also includes a light fixture that includes a base disposed on and sealing the top end of the base can and that includes an electronics compartment. The light fixture further includes a wireless power receiver disposed in the electronics compartment and that wirelessly receives power from the wireless power transmitter. The light fixture also includes a light source that receives power from the wireless power receiver.

In another example embodiment, a wirelessly powered airfield lighting system includes a constant current regulator to supply power and a plurality of wirelessly powered lighting devices. The plurality of wirelessly powered lighting devices receive power from the constant current regulator. Each wirelessly powered lighting device includes a base can and a wireless power transmitter disposed in the base can. The wireless power transmitter can wirelessly transmit power. Each lighting device further includes an isolation transformer disposed outside the base can. The isolation transformer is electrically coupled to and between the wireless power transmitter and a power source. Each lighting device also includes a light fixture that includes a base disposed on and sealing the top end of the base can and that includes an electronics compartment. The light fixture further includes a wireless power receiver disposed in the electronics compartment and that wirelessly receives power from the wireless power transmitter. The light fixture also includes a light source that receives power from the wireless power receiver.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein:

FIG. 1A illustrates a wirelessly powered lighting device in an airfield lighting system, in accordance with example embodiments of the present disclosure;

Figure 1B:
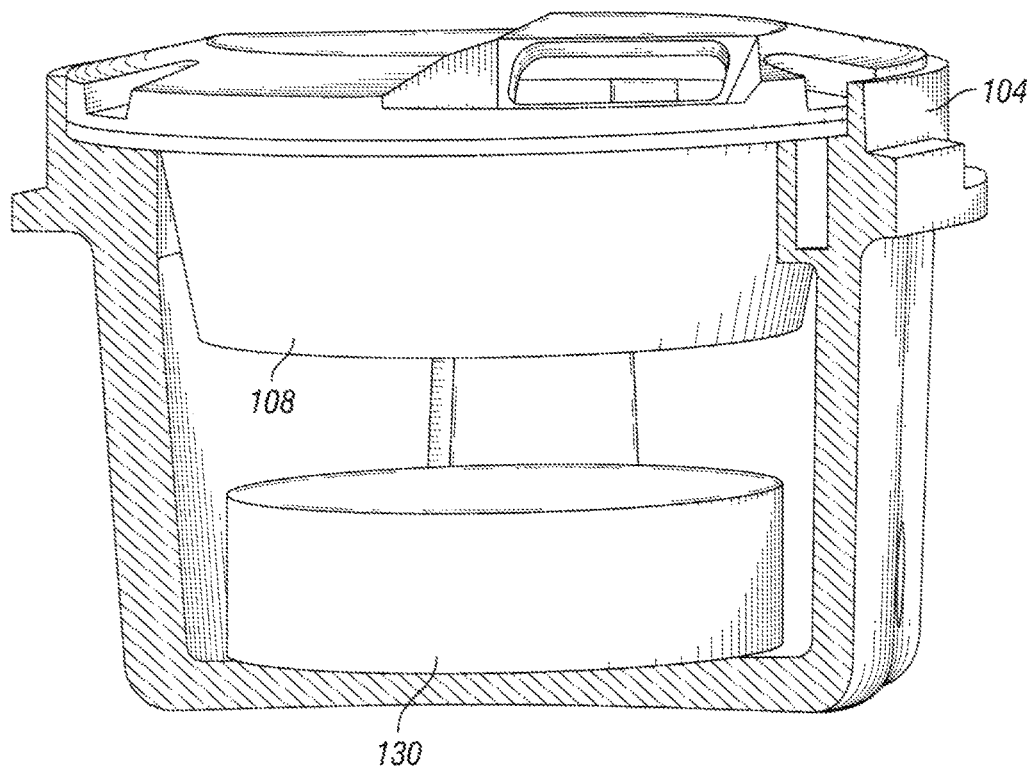
FIG. 1B illustrates the wirelessly powered lighting device of FIG. 1A including a cover that houses a transmitter of the wirelessly powered lighting device, in accordance with example embodiments of the present disclosure.

The drawings illustrate only example embodiments of the invention and are therefore not to be considered limiting of its scope, as the invention may admit to other equally effective embodiments. In the drawings, reference numerals designate like or corresponding, but not necessarily identical, elements.

DETAILED DESCRIPTION OF EXAMPLE EMBODIMENTS

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s). Example embodiments disclosed herein are directed to wirelessly powering light fixtures in an airfield lighting system. Specifically, techniques disclosed herein allow removing a light fixture from the airfield lighting system without the need to handle high voltage power delivery connections. The capability to remove a light fixture from the airfield lighting system without the need to handle high voltage power delivery connections facilitates the process of servicing and replacement of individual light fixtures in the airfield lighting system.

Referring to the drawings, FIG. 1A illustrates a wirelessly powered lighting device 100 in an airfield lighting system, in accordance with example embodiments of the present disclosure. In certain example embodiments, the lighting device 100 includes a light fixture 102, a base can 104, and a power delivery assembly 122. In certain example embodiments, the power delivery assembly 122 is disposed within the can 104, and the light fixture 102 is mounted on or partially disposed in the can 104. In certain example applications, the can 104 is disposed underground, or below grade, for example, deep under an airfield runway and the light fixture 102 is at ground level. In certain example embodiments, the can 104 is made from a metallic material.

In one example embodiment, the can 104 is made from a ferromagnetic material. The can 104 can be a vessel shaped like a cylinder, a box, or other shape. For example, the base can 104 may be a 12 inch can. In certain example embodiments, the light fixture 102 includes a base 110 which sits on or above the can 104. For example, the base 110 may be at a ground level. In certain such embodiments, the base 110 of the light fixture 102 covers an opening 126 of the can 104 such that the internal components of the can are not exposed. For example, the light fixture 102 may be detached from the base can 104 by decoupling the base 110 from the base can 104. In some alternative embodiments, the can 104 may have a closed top end instead of the opening 126 without departing from the scope of this disclosure. In certain example embodiments, the light fixture 102 also includes a riser column 106 which raises an emitting portion 128 of the light fixture 102 to a certain height or distance above grade. In certain example embodiments, the base 110 includes an electronics compartment 108. In certain example embodiments, the electronics compartment 108 is on an underside of the base 110 opposite the emitting portion 128, and is disposed within the can 104.

The electronics compartment 108 includes a wireless power receiver 114 and other electronics for processing the received power and driving the emitting portion 128. In certain applications, when the light device 100 is deployed in the field, a certain amount of water may accumulate in the can 104. In such situations, the electronics compartment 108 may be kept away from the water since it is held near the top of the can 104. Thus, the electronics of the light fixture 102 may be kept dry.

In certain example embodiments, the power delivery assembly 122 is coupled to an isolation transformer 120. The isolation transformer 120 is coupled to a power cable 116 which supplies a constant current from a power source (not shown) to the power delivery assembly 122. In certain example embodiments, the power cable 116 enters the can 104 through an opening and exits the can 104 via another opening in the can 104. The isolation transformer 120 provides a means of transferring power from the power cable 116 or power source to the power delivery assembly 122 while isolating the power delivery assembly 122 from the power source. The power delivery assembly 122 is coupled to and delivers power to a wireless power transmitter 124. The wireless power transmitter 124 is wirelessly coupled to the wireless power receiver 114 of the light fixture 102. The wireless power transmitter 124 can transmit power wirelessly to the wireless power receiver 114. The power is then used to drive the emitting portion 128 of the light fixture 102. In certain example embodiments, the wireless power receiver 114 provides power to a driver 112 which processes the power for use by the light fixture 102. As such, the light fixture 102 does not need to be physically coupled to the power delivery assembly 122 or the power cable 116 via physical connections. Thus, the light fixture 102 can be easily removed from the can 104 for servicing or replacement.

In certain example embodiments, the wireless power transmitter 124, or a separate barrier adjacent to the transmitter 124, blocks the power cable 116 or isolation transformer 120 from being accessible from above the wireless power transmitter 124 as an additional safety measure. In certain example embodiments, the wireless power transmitter 124 is configured in a way such that the power cable 116 and/or portions of the isolation transformer 120 are visible from above the wireless power transmitter 124. Such a configuration may include a coil in which gaps in the coil provide visibility.

FIG. 1B illustrates the wirelessly powered lighting device of FIG. 1A including a cover 130 that houses a transmitter of the wirelessly powered lighting device, in accordance with example embodiments of the present disclosure. Referring to FIGS. 1A and 1B, in some example embodiments, the electronic compartment 108 and the cover 130 are disposed inside the base can 104. The cover 130 houses the transmitter 124. For example, the cover 130 may protect the transmitter from exposure to water. Further, the cover 130 may house the power delivery assembly 122 and the isolation transformer 120. For example, the cover 130 may allow the transmitter 124 and the isolation transformer 120 to be operational underwater as shown by a possible water level 132. In some example embodiments, the transmitter 124 and the power delivery assembly 122 may be within the cover 130, and the isolation transformer 120 may be outside the cover 130. In some alternative embodiments, the cover 130 may have a shape other than shown in FIG. 1B.

Figure 2:
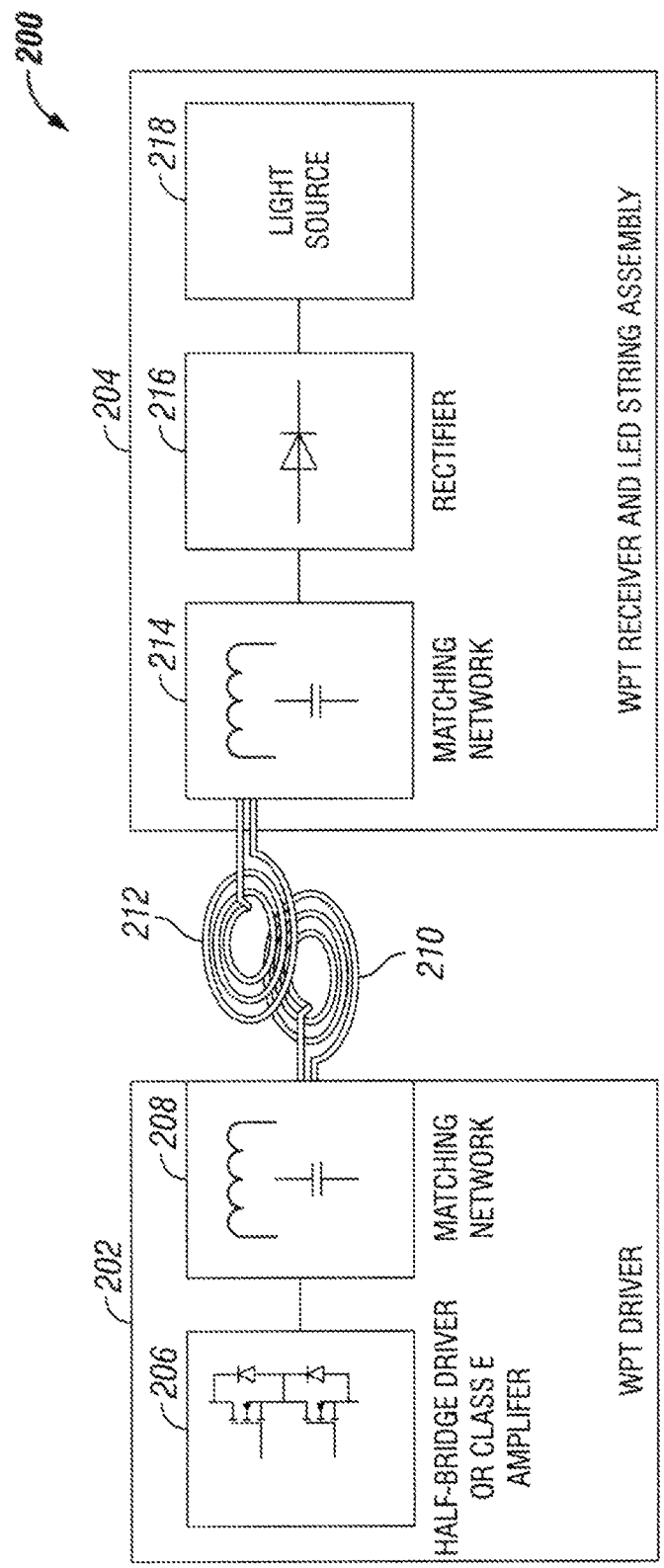
FIG. 2 illustrates a diagram of a wireless power transceiver of a lighting device in an airfield lighting system, in accordance with example embodiments of the present disclosure.

FIG. 2 illustrates a diagram of a wireless power transceiver 200 of the lighting device 100 of FIG. 1A in an airfield lighting system, in accordance with example embodiments of the present disclosure. The wireless power transceiver 200 includes a transmitter circuit 202. For example, the transmitter 124 of FIG. 1A may include the transmitter circuit 202. The wireless power transceiver 200 also includes a receiver circuit 204. For example, the receiver 114 of FIG. 1A may include the receiver circuit 204. To illustrate, the wireless power transceiver 200 may receive power from the power delivery assembly 122 of FIG. 1A.

In certain example embodiments, the transmitter circuit 202 includes a high-frequency power structure 206 such as a full or half H-bridge, an E-class amplifier, and the like. In some example embodiments, the high-frequency power structure 206 receives power from the power cable 116 via the isolation transformer 120 and the power delivery assembly 122. The power delivery assembly 122 may operate as the interface between the input current delivered by the isolation transformer 120 and the wireless power transmitter 124. To illustrate, the power delivery assembly 122 may take the input current level from the isolation transformer and translate the current to the appropriate bus voltage for driving the wireless power transmitter 124. For example, the power delivery assembly 122 may translate the current to approximately 30 to 75 VDC. In some example embodiments, the power deliver assembly 122 and the wireless power transmitter 124 could be combined in one assembly that performs both functions. The transmitter circuit 202 further includes a transmitter capacitor or resonant network 208 which is coupled to a transmitter coil 210. The transmitter capacitor or resonant network 208 may provide impedance matching.

In certain example embodiments, the receiver circuit 204 includes a receiver coil 212 and a receiver capacitor or resonant network 214. The transmitter resonant network 208 and the receiver resonant network 214 may be standard components of wireless power transfer technology, which places the transmitter coil 210 and the receiver coil 212 in resonance to enable efficient wireless power transfer between the wireless power transmitter 124 and the wireless power receiver 114.

In certain example embodiments, the coils 210, 212 are designed to be effective within the environment provided by the can 104. To illustrate, the configuration of the coils 210, 212 are designed depending on the shape and material of the base can 104. In some example embodiments, base can 104 may be a 12 inch can. The configuration of the coils 210, 212 may vary in size, number of coils, shape, and other attributes to maximize coupling between the coils or minimize the effect, like losses introduced by the presence of the metal can. The coils 210, 212 can be air coils made of wire or Litz wire, implemented on a PCB, or coils that include ferrites to increase coupling or decrease losses due to the presence of the can. As a non-limiting example, the coils 210, 212 may each be a planar coil backed by a ferrite sheet.

In certain example embodiments, the receiver circuit 204 further includes a rectifier 216 which processes the received power for delivery to a light source 218. The rectifier 216 can be as simple as a passive diode rectifier or another AC/DC converter to drive the light source 218.

FIG. 2 illustrates an example of a wireless power interfacing scheme. Other embodiments of the present disclosure includes other known or new means of implementing wireless power transfer and the electronic elements required to do so. In certain example embodiments, the lighting device 100 can include any of the systems and techniques described in U.S. patent application Ser. No. 14/681,561.

Figure 3:
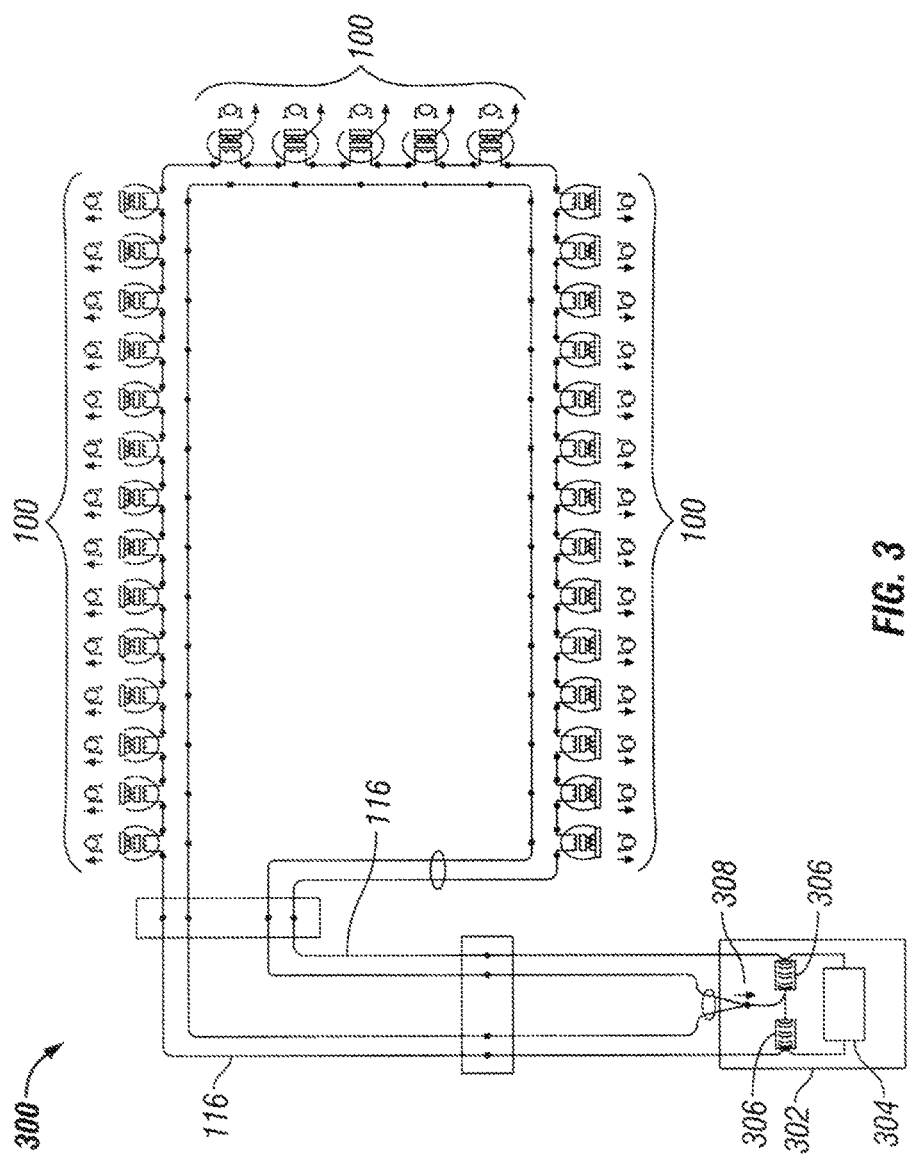
FIG. 3 illustrates a schematic of an airfield lighting system with wirelessly powered light fixtures, in accordance with example embodiments of the present disclosure.

FIG. 3 illustrates a schematic of an airfield lighting system 300 with wirelessly powered lighting devices 100, in accordance with example embodiments of the present disclosure. In certain example embodiments, the airfield lighting system 300 includes a plurality of wirelessly powered lighting devices 100 coupled in series via the power cable 116. In certain example embodiments, the system 300 includes a power source such as a constant current regulator 302 which provides power to the series of lighting devices 100 via the power cable 116. In certain example embodiments, the constant current regulator 302 includes an output winding 304, a lightening arrestor 306, and a ground connection 308. In certain example embodiments, if one of the lighting devices 100 has a light fixture 102 (more clearly shown in FIG. 1A) that requires maintenance or replacement, that particular light fixture 102 can potentially be removed from the base can 104 of the particular lighting devices 100 without disrupting operation of the other lighting devices 100 and without the need to power down the entire system 300.

In certain example embodiments, an existing airfield lighting system can be retrofitted with the wirelessly power lighting devices 100. To illustrate, in some example embodiments, the wireless power transceiver 200 shown in FIG. 2 can replace an existing wired light fixture and couple directly to the existing isolation transformer 120 or to the existing power delivery assembly 122. In another example embodiment, the entire wirelessly powered lighting device 100, including the base can 104, can replace an existing non-wireless lighting device by coupling directly to the power cable 116.

Figure 4:
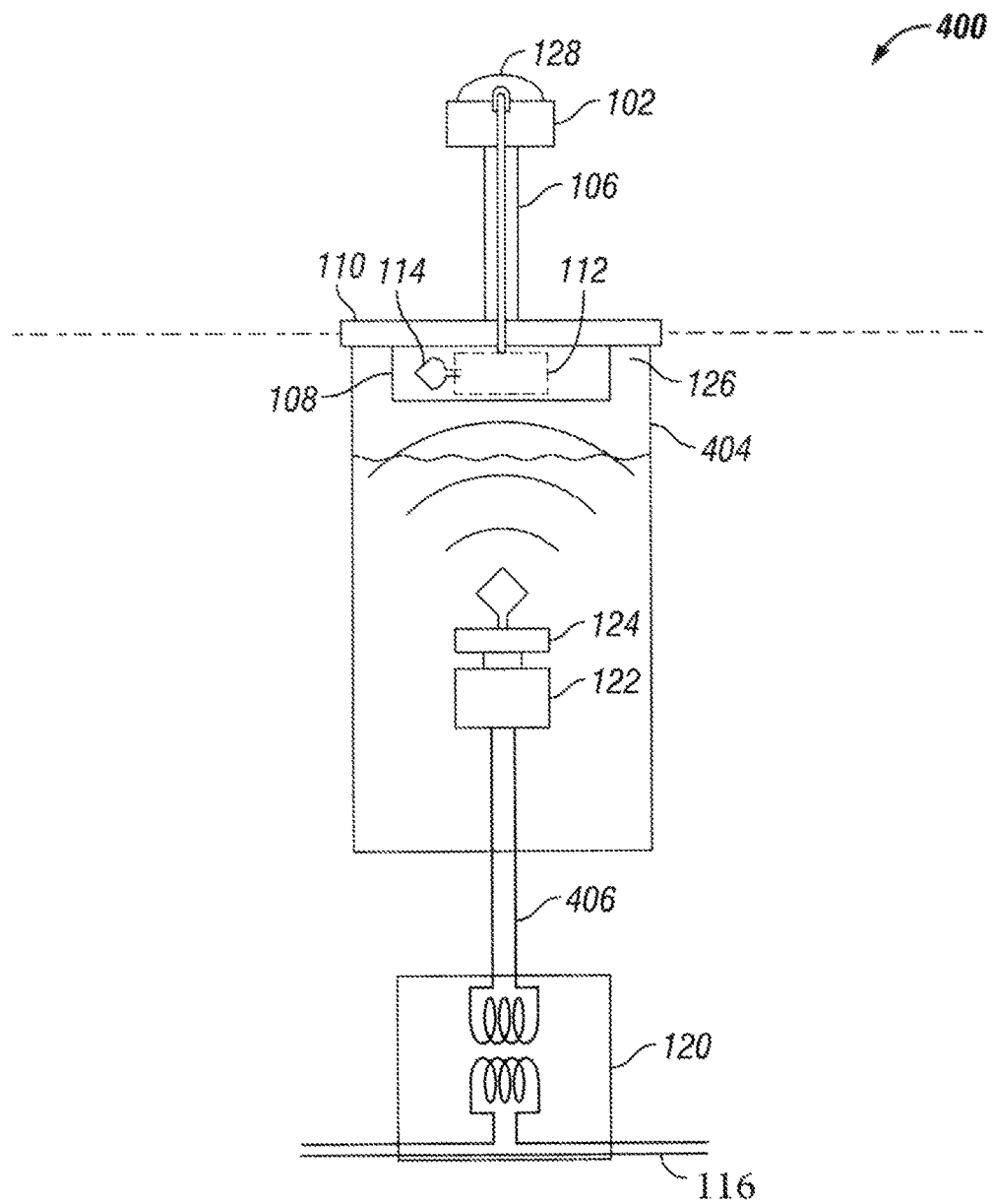
FIG. 4 illustrates a wirelessly powered lighting device in an airfield lighting system, in accordance with other example embodiments of the present disclosure.

FIG. 4 illustrates a wirelessly powered lighting device 400 in an airfield lighting system, in accordance with another example embodiment of the present disclosure. The lighting device 400 is similar to the lighting device 100 with the primary difference related to the location of the isolation transformer 120. To illustrate, in some example embodiments, the lighting device 400 includes the light fixture 102, a base can 404, and the power delivery assembly 122. Similar to the lighting device 100, the power delivery assembly 122 is disposed within the can 404, and the light fixture 102 is mounted on or partially disposed in the can 404. In certain example applications, the base can 404 can be disposed underground or below grade, for example, deep under an airfield runway, and the light fixture 102 can be at ground level. In certain example embodiments, the base can 404 is made from a metallic material.

In one example embodiment, the base can 404 is made from a ferromagnetic material. The base can 404 can be a vessel shaped like a cylinder, a box, or other shape. For example, the base can 404 may be an 8 inch shallow base can. In some example embodiments, the base can 404 is the same as the base can 104. The light fixture 102 may be coupled to the base can 404 substantially as described with respect to FIG. 1A and the base can 104. For example, the base 110 of the light fixture 102 may cover an opening 126 of the base can 404 such that the internal components of the can are not exposed. In some alternative embodiments, the can 104 may have a closed top end instead of the opening 126 without departing from the scope of this disclosure.

In certain example embodiments, the power delivery assembly 122 is coupled to the isolation transformer 120 that is outside of the base can 404. To illustrate, the power delivery assembly 122 may be coupled to the isolation transformer 120 via a second cable 406. For example, the cable 406 may have a length in a range of 30 feet to 100 feet. To illustrate, the isolation transformer 120 may be placed in a concrete pit on a side of an airfield runway while the lighting device 100 is buried under the airfield runway. In some alternative embodiments, the second cable 406 may be shorter than 30 feet or longer than 100 feet.

As illustrated in FIG. 4, the isolation transformer 120 may be coupled to the power cable 116 that provides power to the power delivery assembly 122 through the isolation transformer 120 via the second cable 406. In certain example embodiments, the second cable 406 enters the base can 404 through an opening, for example, at the bottom of the base can 404. The isolation transformer 120 provides a means of transferring power from the power cable 116 or power source to the power delivery assembly 122 while isolating the power delivery assembly 122 from the power source. Power is provided from the power delivery assembly 122 to the light fixture 102 in the same manner as described with the lighting device 100 of FIG. 1A. As is the case with the lighting device 100, the light fixture 102 of the lighting device 400 does not need to be physically coupled to the power delivery assembly 122 or the power cable 116 via physical connections. Thus, the light fixture 102 can be easily removed from the base can 404 for servicing or replacement.

In some example embodiments, the cover 130 (shown in FIG. 1B) may cover the transmitter 124 and the power delivery assembly 122 as described with respect to FIG. 1A. For example, the cover 130 may be disposed in the base can 404 and protect the transmitter 124 and the power delivery assembly 122 from exposure to water.

Figure 5:
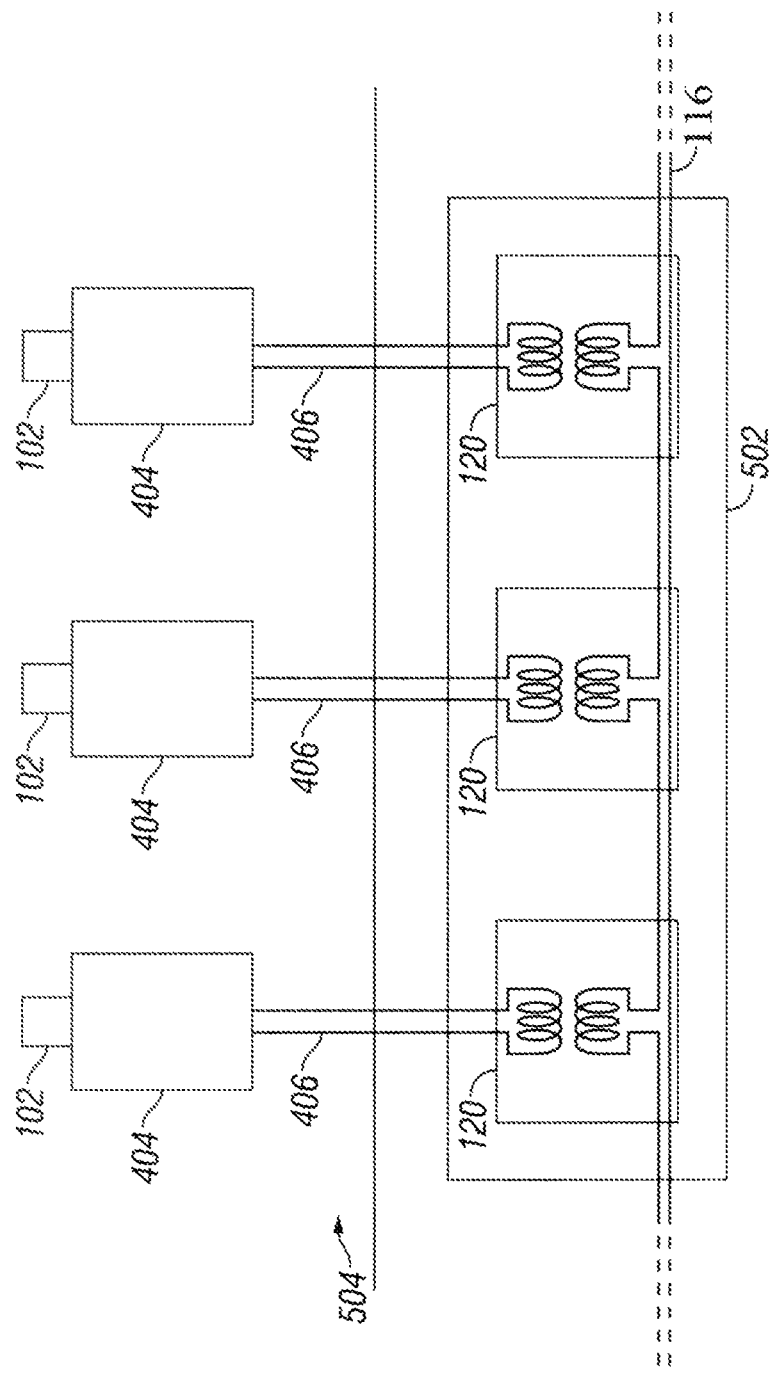
FIG. 5 illustrates a schematic of an airfield lighting system with wirelessly powered light devices, in accordance with another example embodiment of the present disclosure.

FIG. 5 illustrates a schematic of an airfield lighting system 500 with wirelessly powered light devices 400, in accordance with another example embodiment of the present disclosure. The airfield lighting system 500 includes a plurality of wirelessly powered lighting devices 400 coupled in series via the power cable 116. The airfield lighting system 500 may be powered in the same manner as described with respect to the airfield lighting system 300 of FIG. 3. As illustrated in FIG. 5, the isolation transformers 120 may be located off a runway and the base can 404 may be buried underneath the runway 504. For example, the isolation transformers 120 may be placed in a concrete pit 502 that is on a side of the runway 504.

In certain example embodiments, if one of the light fixtures 102 requires maintenance or replacement, that particular light fixture 102 may be removed from the base can 404 without disrupting operation of the other light fixtures 102 and without the need to power down the entire system 500. Further, if one of the cans 104 along with its lighting fixture 102 and supporting components requires maintenance or replacement, the maintenance and replacement may be performed without shutting down the entire system 500.

In certain example embodiments, an existing airfield lighting system can be retrofitted with the wirelessly power lighting devices 400. To illustrate, in some example embodiments, the wireless power transceiver 200 shown in FIG. 2, which can be used with the lighting device 400 in the same manner as described above, can replace an existing wired light fixture and couple directly to the existing isolation transformer 120 or to the existing power delivery assembly 122. In another example embodiment, the entire wirelessly powered lighting device 400, including the base can 404, can replace an existing non-wireless lighting device by coupling directly to the power cable 116.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A wirelessly powered airfield lighting device, comprising:
   a base can;
   a wireless power transmitter disposed in the base can, the wireless power transmitter to wirelessly transmit power;
   a cover disposed inside the base can, wherein the cover houses the wireless power transmitter and protects the wireless power transmitter from exposure to water when the water is inside the base can;
   an isolation transformer disposed inside the base can, wherein the isolation transformer is electrically coupled to and between the wireless power transmitter and a power source; and
   a light fixture comprising:
      a base disposed on and sealing the top end of the base can, the base comprising an electronics compartment that is at least partially disposed in the base can;
      a wireless power receiver disposed in the electronics compartment and to wirelessly receive power from the wireless power transmitter; and
      a light source to receive power from the wireless power receiver.

2. The wirelessly powered airfield lighting device of claim 1, wherein the wireless power transmitter is disposed between the isolation transformer and the wireless power receiver.

3. The wirelessly powered airfield lighting device of claim 1, wherein the light source is disposed on top of the base and wherein the electronics compartment is disposed on the bottom of the base opposite the light source.

4. The wirelessly powered airfield lighting device of claim 3, wherein the electronics compartment is disposed within the base can.

5. The wirelessly powered airfield lighting device of claim 1, wherein the light source is disposed within the base.

6. The wirelessly powered airfield lighting device of claim 1, wherein the light fixture is detachable from the base can by decoupling the base from the base can.

7. The wirelessly powered airfield lighting device of claim 6, wherein the light fixture is detachable from the base can without removing the wireless power transmitter from inside the base can.

8. The wirelessly powered airfield lighting device of claim 1, wherein the isolation transformer is coupled to the power source using a cable and wherein the light fixture is detachable from the base can without decoupling the isolation transformer from the power source.

9. A wirelessly powered airfield lighting device, comprising:
   a base can;
   a wireless power transmitter disposed in the base can, the wireless power transmitter to wirelessly transmit power;
   a cover disposed inside the base can, wherein the cover houses the wireless power transmitter and protects the wireless power transmitter from exposure to water when the water is inside the base can;
   an isolation transformer disposed outside the base can, wherein the isolation transformer is electrically coupled to and between the wireless power transmitter and a power source; and
   a light fixture comprising:

a base disposed on and sealing the top end of the base can, the base comprising an electronics compartment that is at least partially disposed in the base can;

a wireless power receiver disposed in the electronics compartment and to wirelessly receive power from the wireless power transmitter; and a light source to receive power from the wireless power receiver.

10. The wirelessly powered airfield lighting device of claim 9, wherein the light source is disposed on top of the base and wherein the electronics compartment is disposed on the bottom of the base opposite the light source.

11. The wirelessly powered airfield lighting device of claim 10, wherein the electronics compartment is disposed within the base can.

12. The wirelessly powered airfield lighting device of claim 9, wherein the light fixture is detachable from the base can by decoupling the base from the base can.

13. A wirelessly powered airfield lighting system, comprising:

a constant current regulator to supply power; and a plurality of wirelessly powered lighting devices, the plurality of wirelessly powered lighting devices receiving power from the constant current regulator, wherein each wirelessly powered lighting device comprises:

a wireless power transmitter disposed in a base can, the wireless power transmitter to wirelessly transmit power;

a cover disposed inside the base can, wherein the cover houses the wireless power transmitter and protects the wireless power transmitter from exposure to water when the water is inside the base can;

an isolation transformer, wherein the isolation transformer is electrically coupled to and between the wireless power transmitter and a power source; and a light fixture comprising:

a base disposed on and sealing the top end of the base can, the base comprising an electronics compartment that is at least partially disposed in the base can;

a wireless power receiver disposed in the electronics compartment and to wirelessly receive power from the wireless power transmitter; and a light source to receive power from the wireless power receiver.

14. The wirelessly powered airfield lighting system of claim 13, wherein the plurality of wirelessly powered lighting devices are electrically coupled together in series.

15. The wirelessly powered airfield lighting system of claim 13, wherein isolation transformer is disposed inside the base can.

16. The wirelessly powered airfield lighting system of claim 13, wherein isolation transformer is disposed outside the base can.

17. The wirelessly powered airfield lighting system of claim 13, wherein the light fixture of each wirelessly powered lighting device is detachable from the base can without disconnect the power from the constant current regulator.

* * * * *